United States Patent [19]

Arimilli et al.

[11] Patent Number: 6,029,204
[45] Date of Patent: Feb. 22, 2000

[54] PRECISE SYNCHRONIZATION MECHANISM FOR SMP SYSTEM BUSES USING TAGGED SNOOP OPERATIONS TO AVOID RETRIES

[75] Inventors: Ravi Kumar Arimilli, Austin; John Steven Dodson, Pflugerville; Jerry Don Lewis, Round Rock; Derek Edward Williams, Austin, all of Tex.

[73] Assignee: International Business Machines Corporation, Armonk, N.Y.

[21] Appl. No.: 08/815,648

[22] Filed: Mar. 13, 1997

[51] Int. Cl.[7] .......................... G06F 12/00; G06F 13/36; G06F 13/42
[52] U.S. Cl. .......................... 709/248; 709/200; 709/201; 709/400; 711/141; 711/143; 711/146; 395/182.1; 395/740
[58] Field of Search .......................... 395/182.1, 200.78, 395/553, 671, 676, 677, 740; 711/141, 143, 146, 119; 712/29, 30; 709/400, 200, 201, 248

[56] References Cited

U.S. PATENT DOCUMENTS

| | | | |
|---|---|---|---|
| 5,025,365 | 6/1991 | Mathur et al. | 711/121 |
| 5,091,846 | 2/1992 | Sachs et al. | 711/130 |
| 5,127,098 | 6/1992 | Rosenthal et al. | 395/650 |
| 5,133,074 | 7/1992 | Chou | 711/146 |
| 5,222,217 | 6/1993 | Blount et al. | 707/204 |
| 5,222,229 | 6/1993 | Fukuda et al. | 395/553 |
| 5,239,641 | 8/1993 | Horst | 395/553 |
| 5,319,766 | 6/1994 | Thaller et al. | 711/146 |
| 5,384,846 | 1/1995 | Horst | 709/400 |
| 5,398,325 | 3/1995 | Chang et al. | 711/146 |
| 5,448,732 | 9/1995 | Matsumoto | 395/553 |
| 5,506,987 | 4/1996 | Abramson et al. | 709/302 |
| 5,550,988 | 8/1996 | Sarangdhar et al. | 710/113 |
| 5,553,248 | 9/1996 | Melo et al. | 395/296 |
| 5,553,266 | 9/1996 | Metzger et al. | 711/146 |
| 5,555,382 | 9/1996 | Thaller et al. | 711/146 |
| 5,634,071 | 5/1997 | Dewa et al. | 395/800.13 |
| 5,734,922 | 3/1998 | Hagersten et al. | 395/800.37 |
| 5,737,758 | 4/1998 | Merchant | 711/146 |
| 5,749,095 | 5/1998 | Hagersten et al. | 711/141 |
| 5,778,438 | 12/1995 | Merchant | 711/146 |
| 5,787,301 | 3/1995 | Arakawa et al. | 395/200.78 |
| 5,875,467 | 12/1995 | Merchant | 711/140 |

Primary Examiner—Frank J. Asta
Assistant Examiner—William C. Vaughn, Jr.
Attorney, Agent, or Firm—Mark E. McBurney; Andrew J. Dillon

[57] ABSTRACT

A method of synchronizing an initiating processing unit in a multi-processor computer system with other processing units in the system, by assigning a unique tag for each processing unit, and issuing synchronization messages which include the unique tag of an initiating processing unit. The processing units each have a snoop queue for receiving snoop operations and corresponding tags associated with instructions issued by an initiating processing unit, and the processors examine their respective snoop queues to determine whether any snoop operation in those queues has a tag which is the unique tag of the initiating processing unit. A retry message is sent to the initiating processing unit from any of the other processing units which determine that a snoop operation in a snoop queue has a tag which is the unique tag of the initiating processing unit. In response to the retry message, the initiating processing unit re-issues the synchronization message, and the other processors re-examine their respective snoop queues, in response to the re-issuing of the synchronization message, to determine whether any snoop operation in those queues still has a tag which is the unique tag of the initiating processing unit.

6 Claims, 1 Drawing Sheet

PRECISE SYNCHRONIZATION MECHANISM FOR SMP SYSTEM BUSES USING TAGGED SNOOP OPERATIONS TO AVOID RETRIES

BACKGROUND OF THE INVENTION

1. Field of the Invention

The present invention generally relates to computer systems and, more particularly, to a method of synchronizing instructions executed by different processors in a multi-processor computer system.

2. Description of the Related Art

Modern computing systems are often constructed from a number of processing elements and a main memory, connected by a generalized interconnect. The basic structure of a conventional multi-processor computer system 10 is shown in FIG. 1. Computer system 10 has several processing units 12a, 12b, and 12c which are connected to various peripheral devices, including input/output (I/O) devices 14 (such as a display monitor, keyboard, and permanent storage device), memory device 16 (such as dynamic random-access memory or DRAM) that is used by the processing units to carry out program instructions, and firmware 18 whose primary purpose is to seek out and load an operating system from one of the peripherals (usually the permanent memory device) whenever the computer is first turned on.

Processing units 12a–12c communicate with the peripheral devices by various means, including a bus 20. Computer system 10 may have many additional components which are not shown, such as serial and parallel ports for connection to, e.g., modems or printers. Those skilled in the art will further appreciate that there are other components that might be used in conjunction with those shown in the block diagram of FIG. 1; for example, a display adapter might be used to control a video-display monitor, a memory controller can be used to access memory 16, etc. The computer can also have more than three processing units. In a symmetric multi-processor (SMP) computer, all of the processing units 12a–12c are generally identical, that is, they all use a common set or subset of instructions and protocols to operate, and generally have the same architecture.

The processing units can themselves consist of: a processor (having a plurality of registers and execution units, which carry out program instructions in order to operate the computer); other elements (such as caches) that form a "memory hierarchy" for the processing unit; or even multiple processor nests in a single processing unit. Many possible configurations are possible, and this list is not meant to be a complete taxonomy. In these systems, the processors communicate with main memory and one another by passing operations over the interconnect. To coordinate their operations, most processing units employ some form of "retry" protocol. In this protocol, when a processing unit wishes to initiate an operation, the initiating processing unit places the operation on the interconnect. All of the other units which are attached to the interconnect monitor ("snoop") the operation and determine if it can be allowed to proceed. If one or more of the snoop participants cannot allow the operation to proceed, the initiating processor is signaled through some mechanism that the operation needs to be retried. The initiating processor then typically places the operation out on the interconnect again at a later time. To support snooping and to facilitate the determination of a "retry" or "no retry" response for each snooped operation, most processing units employ some form of "snoop queue." This queue is a list of entries for each processing unit that holds the state of snoop operations that are currently in-progress on the processing element.

In certain cases, a processing unit may not issue a "retry" response to an operation, thereby signalling that earlier operations have been completed when, in fact, the effects of the earlier operations have not been entirely propagated throughout the processing unit. This approach allows for potentially higher performance by pipelining operations onto the interconnect. It is often the case, however, that an initiating processing unit needs some mechanism to ensure that all of the effects of operations previously initiated have, in fact, been completely propagated through all the other processing units in the system. To allow this, most architectures support the concept of a synchronization instruction, such as the sync instruction used in IBM PowerPC™ processors. This instruction is executed on a given processor and ensures that all the effects of the operations initiated by that processor have been completely propagated within all other processing elements in the system. The exact semantics of this instruction vary in detail, but not general concept, between architectures. The sync instruction is, for example, often used following a flush instruction. The flush instruction is used to insure that no block corresponding to the address of the flush instruction is present in any cache in the overall system. To achieve this, the flush instruction causes all caches to abandon any unmodified copies of the cache block or, if the block is modified, to write the block back to main memory.

The sync instruction, unlike the operations it is used to ensure have completed, must be retried until all of the previous operations have, in fact, been completely finished on all processing units. To accomplish this, a processing unit, upon snooping a sync, must retry it if any operations are outstanding from the processor that issued the sync. However, in many current interconnect protocols (IBM's 60X bus protocol, for example), it is not possible to determine from which processing unit an operation originated. In such a system, a processing unit must then retry every sync instruction if any operations are outstanding in its snoop queue, regardless of the origin of those operations, because it is impossible to determine if the outstanding operations in the snoop queue are from the processing unit issuing the sync. Furthermore, in the prior art, it is also impossible to determine what processing element is issuing the sync instruction in the first place. This limitation is inherently inefficient and can lead to starvation and livelocks. It would, therefore, be desirable and advantageous to devise a method of synchronizing processor operation in a multi-processor computer system which eliminated unnecessary delays or degradation of performance due to a processing unit waiting for completion of operations which are irrelevant to the synchronization.

SUMMARY OF THE INVENTION

It is therefore one object of the present invention to provide an improved method of synchronizing operations of different processors in a multi-processor computer system.

It is another object of the present invention to provide such a method which not only increases performance but further alleviates starvation and livelocks, and makes more efficient use of the interconnect bandwidth.

It is yet another object of the present invention to provide such a method which ignores processor operations that are irrelevant to the synchronization operation.

The foregoing objects are achieved in a method of synchronizing an initiating processing unit in a multi-processor computer system with other processing units in the system, generally comprising the steps of assigning a unique tag with the initiating processing unit, and issuing a synchronization message from the initiating processing unit to the other processing units, the synchronization message including the unique tag of the initiating processing unit (generally, all operations from the initiating processor will be assigned the same tag). The other processing units each have a snoop queue for receiving snoop operations and corresponding tags associated with instructions issued by the initiating processing unit, and the other processing units examine their respective snoop queues to determine whether any snoop operation in those queues has a tag which matches the unique tag of the initiating processing unit. Prior to issuing the synchronization message, the other processing units store snoop operations associated with instructions issued by initiating processing units in the snoop queues, and associate the unique tag with each of the snoop operations. A retry message is sent to an initiating processing unit from any of the other processing units when one of the other units determines that a snoop operation is in its snoop queue and has a tag which matches the unique tag of the initiating processing unit. In response to the retry message, the initiating processing unit re-issues the synchronization message at a later point in time, and the other processing units re-examine their respective snoop queues, in response to the re-issuing of the synchronization message, to determine whether any snoop operation still in those queues has a tag which matches the unique tag of the initiating processing unit.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF THE PREFERRED EMBODIMENT

Figure 1:
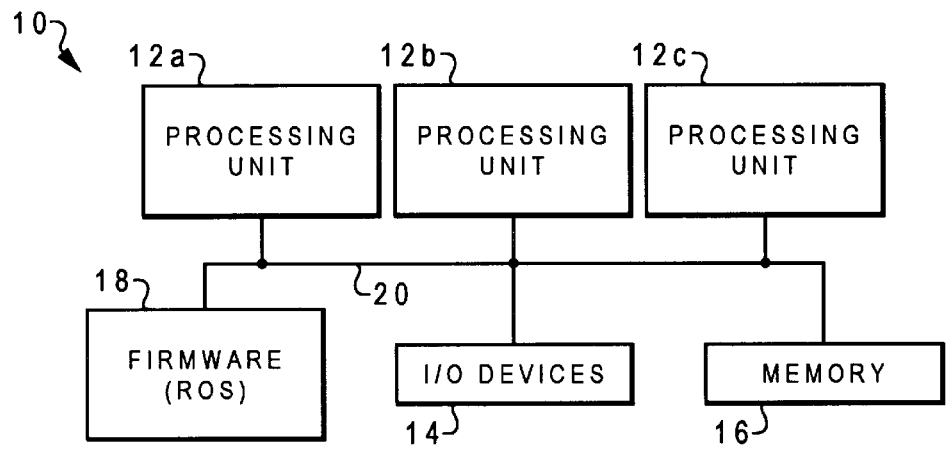
FIG. 1 is a block diagram of a prior-art multi-processor computer system.
Figure 2:
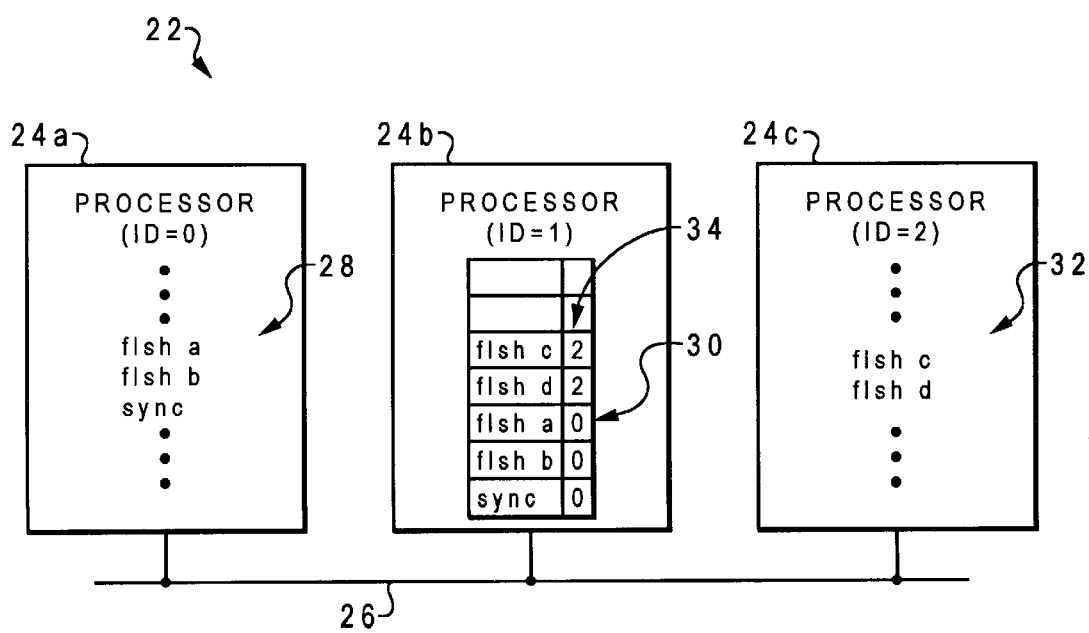
FIG. 2 is a block diagram of three processing units in a multi-processor computer system according to the present invention, wherein the processing units issue synchronization messages (and other messages) which are tagged according to the particular processing unit issuing the instruction, and the tags are associated with entries in the snoop queues of the processing units.

With reference now to the figures, and in particular with reference to FIG. 2, there is depicted one embodiment of a multi-processor computer system 22 according to the present invention. Computer system 22 includes three processing units 24a, 24b and 24c interconnected by a generalized interconnect or bus 26. The processing units can have various architectures, and in this illustrative embodiment would at least include a processor (having registers and execution units which carry out program and system instructions) and one or more caches. Computer system 22 may include other components, such as those discussed above regarding FIG. 1, as well as other new hardware components, or have a novel interconnection architecture for existing components, so the reference to FIG. 1 should not be construed in a limiting sense. Computer system 22 could also have many more than just three processing units.

In the present invention, a unique tag is assigned to each processor, that is transmitted with every operation that a processing unit initiates onto the interconnect 26. It is a straightforward matter to associate with each processing element a unique tag (many conventional interconnect protocols associate such a unique tag or tags with each processing element, and this feature can be used for the purpose of implementing this invention on a system that already has such a protocol). In FIG. 2, processing unit 24a has a tag or ID of zero, processing unit 24b has an ID of one, and processing unit 24c has an ID of two. When an operation is snooped by a processing unit and placed in its snoop queue, the tag associated with the operation is also stored in the snoop queue. Then, when any processing unit snoops a sync instruction, it retries the sync only if one or more of the operation(s) in its snoop queue has a tag that matches the tag of the sync operation. In this manner, a sync from a given processor (determined by the tag) is only retried if previous operations from that processor (determined by the tag entries in the snoop queues) are not yet completely finished on all processing elements. The procedure thus eliminates any potential delays associated with other operations in the snoop queue which are associated with other processors.

Consider, for example, the instruction sequence "flsh a," "flsh b," "sync" (28) from processing unit 24a. This sequence appears in the snoop queue 30 of processing unit 24b (and also appears in the snoop queue of processing unit 24c, although this is not shown). Similarly, another instruction sequence "flsh c," "flsh d" (32) from processing unit 24c appears in snoop queue 30 of processing unit 24b (and is again similarly stored in the snoop queue of processing unit 24a, although this is also not shown). The tags for each message are stored in snoop queue 30 as well, as indicated at 34. Now, when processing unit 24b snoops the "sync" message from processing unit 24a, processing unit 24b retries the "sync" only if the "flsh a" and "flsh b" messages are still in snoop queue 30, i.e., regardless of whether the "flsh c" and "flsh d" messages from processing unit 24c are still in snoop queue 30 (which is acceptable since the completion of operations from processing unit 24c do not affect completion of the synchronization instruction from processing unit 24a). The present invention thereby overcomes the disadvantage of prior-art synchronization protocols which force retries if any operations are outstanding in the snoop queue, irrespective of the origin of those operations. The advantages of this invention are increased performance, alleviation of certain forms of starvation and livelocks, and a more efficient use of interconnect bandwidth.

Performance is improved by allowing sync operations to complete more quickly. In accordance with the method of the present invention, a sync message is only retried in exactly those cases where it must be retried: when a previous operation from the initiating processing element is still outstanding in the snoop queue of another processing element.

Certain starvation scenarios can also be alleviated by this invention. Consider again the three-processing-unit system of FIG. 2. Processing unit 24a may be in a loop constantly writing to a location in memory, while processing unit 24b is in a loop continuously reading the memory location that processing unit 24a is updating (this is commonly referred to as a producer/consumer operation). Processing unit 24c is performing unrelated work and issues a sync message. In prior-art systems, it is highly likely that such a sync would be retried by processing unit 24a, because the snoop queue of processing unit 24a will often contain a snoop operation for the read from processing unit 24b. In such a scenario, and depending upon the system timing, it is possible to easily starve processing unit 24c and prevent it from making any progress on the synchronization. However, the sync from processing unit 24c is not required to be retried by processing unit 24a for snoop operations in processing unit 24a that are not from processing unit 24c. In the system 22 of the present invention, the sync from processing unit 24c will only be retried for operations outstanding due to processing unit 24c. Therefore, the producer/consumer loop on processing units 24a and 24b does not affect progress of any sync from processing unit 24c.

The interconnect bandwidth is used more efficiently because fewer sync operations will be retried and forced to be repeated on the interconnect.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that such modifications can be made without departing from the spirit or scope of the present invention as defined in the appended claims.

We claim:

1. A method of synchronizing an initiating processing unit in a multi-processor computer system with other processing units in the system, comprising the steps of:

assigning unique tags to the initiating processing unit and the other processing units;

storing snoop operations associated with instructions issued by the initiating processing unit and the other processing units in snoop queues located in the other processing units, a given snoop operation having the unique tag associated with a particular one of the processing units that issued a corresponding instruction;

issuing a synchronization message from the initiating processing unit to the other processing units, the synchronization message including the unique tag of the initiating processing unit;

in response to said issuing steps examining the respective snoop queues of the other processing units to determine whether any snoop operation in those queues has a tag which is the unique tag of the initiating processing unit; and in response to a determination from said examining step that a snoop queue in a particular processing unit has a snoop operation with the unique tag of the initiating processing unit sending a retry message to the initiating processing unit from the particular processing unit.

2. The method of claim 1 comprising the further step of the initiating processing unit re-issuing the synchronization message in response to the retry message.

3. The method of claim 2 comprising the further step of the other processors re-examining their respective snoop queues, in response to said re-issuing step, to determine whether any snoop operation in those queues still has a tag which is the unique tag of the initiating processing unit.

4. A processing unit for a computer system, comprising:

a processor which issues instructions with a unique tag associated with the processing unit;

a snoop queue associated with said processor for storing snoop operations associated with instructions issued by other processing units, said snoop queue further associating unique tags with each of said snoop operations, each said unique tag corresponding to a particular one of the other processing units;

means for examining said snoop queue to determine whether any snoop operation in that queue has a tag which is the unique tag of a processing unit that initiated a synchronization message; and means for sending a retry message to the initiating processing unit in response to a determination that a snoop operation in said snoop queue has the unique tag of the initiating processing unit.

5. The processing unit of claim 4 further comprising a cache for providing values to said processor.

6. A multi-processor computer system comprising:

a memory device;

a bus connected to said memory device; and a plurality of processing units connected to said bus, each of said processing units having a snoop queue for storing snoop operations associated with instructions issued by other processing units, each said snoop queue further associating a unique tag with each of said snoop operations, each unique tag corresponding to a particular one of said processing units, and each of said processing units further having means for examining its respective snoop queue to determine whether any snoop operation in that queue has a tag which is the unique tag of a processing unit that initiated a synchronization message, and means for sending a retry message to the initiating processing unit in response to a determination that a snoop operation in said snoop queue has the unique tag of the initiating processing unit.

* * * * *